United States Patent Office 3,042,701
Patented July 3, 1962

3,042,701
ORGANIC PHOSPHATES
Gail H. Birum, Dayton, Ohio, assignor to Monsanto Chemical Company, St. Louis, Mo., a corporation of Delaware
No Drawing. Filed Oct. 21, 1959, Ser. No. 847,684
11 Claims. (Cl. 260—461)

The present invention relates to organic compounds of phosphorus and more particularly provides a new and valuable class of compounds having a plurality of pentavalent phosphorus ester radicals, the method of preparing the same, and leaded hydrocarbon fuels containing the presently provided compounds as pre-ignition agents.

An object of the present invention is to provide polyphosphorus esters wherein phosphorus is present only in the pentavalent state. Another object of the invention is to provide polyphosphorus esters of good hydrolytic stability. Still another object of the invention is to provide a means of improving the hydrolytic stability of certain compounds containing one or more pentavalent phosphorus ester radicals and a single trivalent phosphorus ester radical by changing the latter into the pentavalent phosphorus ester radical. A further object of the invention is to provide stable, chlorine-containing, organic phosphorus compounds for use as preignition and spark plug antifouling agents for leaded gasoline.

These and other objects hereinafter disclosed are provided by the invention wherein there are prepared compounds having a plurality of pentavalent phosphorus ester radicals and being selected from the class consisting of phosphorus diesters of the formula

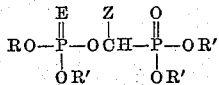

and polyesters of the formula

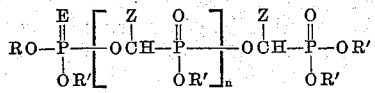

wherein R is selected from the class consisting of haloalkyl, haloalkenyl, alkoxyhaloalkyl and aryloxyhaloalkyl radicals of from 1 to 12 carbon atoms wherein halo denotes chlorine or bromine, R' is selected from the group consisting of R, hydrocarbyl, and halohydrocarbyl radicals of from 1 to 12 carbon atoms, Z is selected from the class consisting of hydrogen, hydrocarbyl, halohydrocarbyl, cyanohydrocarbyl, carboalkoxyhydrocarbyl, alkoxyhydrocarbyl and alkylthiohydrocarbyl radicals of from 1 to 17 carbon atoms and the thienyl and furyl radicals, n is a number having an average value of at least 1 and E is selected from the group consisting of oxygen and sulfur. The term "hydrocarbyl," as used in this case, is defined in Degering, An Outline of Organic Chemistry, 5th edition (1947), page 135 as follows: "Hydrocarbyl is the radical obtained by the loss of a hydrogen atom from and hydrocarbon."

Compounds of the above formula are prepared by interaction of an oxidizing agent or of sulfur with the products obtained from a phosphorohalidite, an aldehyde and a trivalent phosphorus ester. As disclosed in copending application Serial No. 780,262, filed December 15, 1958, mixing together bis(2-chloroethyl) phosphorochloridite, acetaldehyde and tris(2-chloroethyl) phosphite in substantially equimolar proportions gives 1-[bis(2-chloroethoxy)phosphinyl]ethyl bis(2-chloroethyl) phosphite (I), thus:

(I)
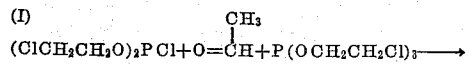
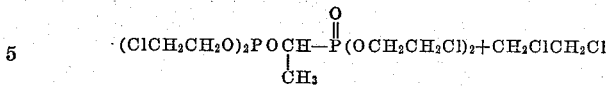

The compound I falls within the general formula

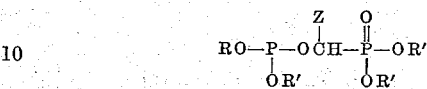

wherein R, R', and Z are as herein defined. I have now found that compounds of this general formula react with an oxidizing agent or with sulfur to give esters in which no trivalent phosphorus is present, thus:

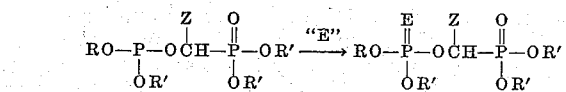

where "E" denotes oxygen or sulfur. In the case of the above compound I, the oxidation or thionation takes place according to the scheme:

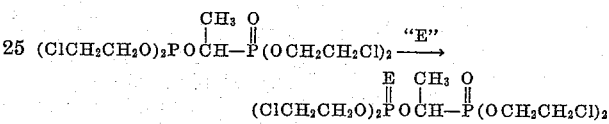

The product thus obtained may be referred to as a phosphate-phosphonate.

Also useful for the preparation of compounds having more than one pentavalent phosphorus ester radical are compounds obtained from phosphorochloridites having dissimilar alcohol residues. For example, methyl 2-chloroethyl phosphorochloridite, butyraldehyde and tris-(2-chloropropyl) phosphite react in equimolar proportions to give a phosphite-phosphonate which upon chemical oxidation or thionation is converted as follows:

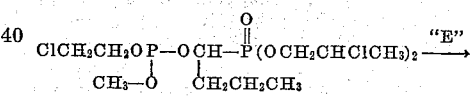

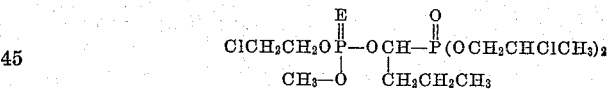

It will be noted that in the oxidation and thionation of these compounds, the phosphorus atom in the trivalent portion of the molecule is changed to the pentavalent state by addition of an oxygen or sulfur atom without disturbing the linkages of that phosphorus atom to the other atoms or groups.

The compound which is formed from a 1:1:1 molar mixture of the trivalent phosphorus halogen compound, the aldehyde and the trivalent phosphorus ester is a phosphite-phosphonate when the ester and the halidite are derived from phosphorus acid, thus:

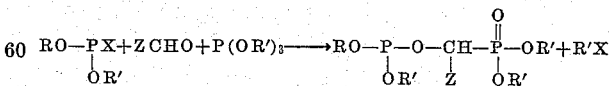

where R, R' and Z are as defined above. It is oxidized or thionated to give the phosphate-phosphonate

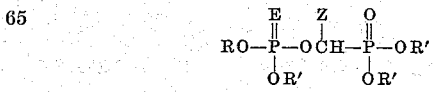

wherein E is oxygen or sulfur.

The 1:1:1 reaction products are thus phosphite-phosphonates. There is always present one trivalent phosphorus ester group and one pentavalent phosphorus ester group. According to the present invention these 1:1:1 reaction products are reacted with an oxidizing agent or sulfur to give phosphate-phosphonates, or their phosphorothioate-phosphonate analogs, respectively.

Also oxidized or thionated are the polyphosphorus esters disclosed in copending application, Serial No. 820,618, filed June 16, 1959, which esters are formed when a mole of the trivalent phosphorus halogen compound and a mole of an aldehyde are contacted with less than one mole of the phosphorus ester. The polyphosphorus esters disclosed in said copending application have the general formula

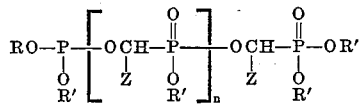

where R, R' and Z are as above defined and $n$ is at least one.

The products provided by the present invention are prepared by chemically oxidizing or thionating the above. The present compounds have the formula:

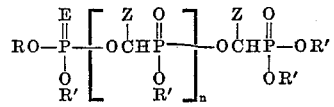

wherein R, R' E and Z are as herein defined and $n$ has a value of at least one. It will be noted that the above formula is like that of the oxidized or thionated products of the compounds obtained from equimolar mixtures of the phosphorus halogen compound, the aldehyde and the phosphorus ester, except for the unit or units

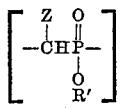

Products having one or more of said units are prepared from polyphosphorus compounds that are obtained from a phosphorus halogen compound, an aldehyde, and an ester, the latter being used in less than an equimolar quantity with respect to each of the other two reactants. In this case a reaction takes place by a chain mechanism whereby, owing to the depletion of the originally present phosphorus ester, the ester which is formed reacts with the halidite and aldehyde that are either still present or are added to the reaction mixture, thus:

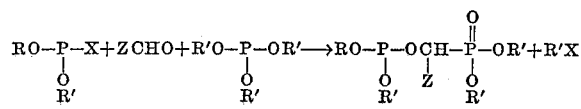

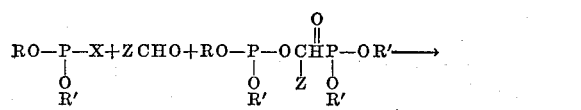

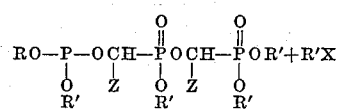

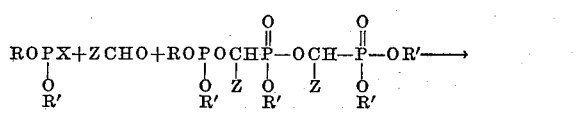

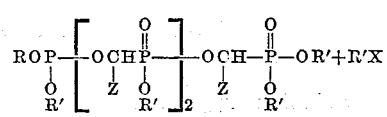

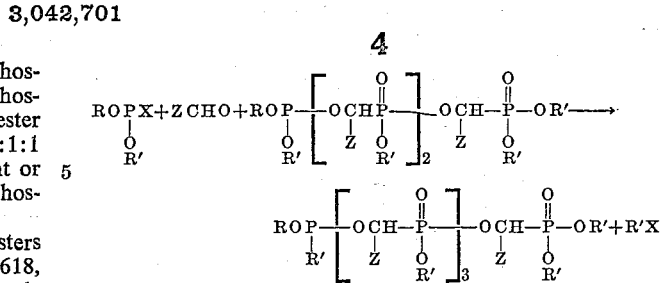

wherein R, R' and Z are as herein defined; X is chlorine or bromine.

From the above, it is apparent that the presence of repeating units

in a product prepared from the ester $P(OR')_3$, the phosphorus halide and the aldehyde depends upon whether the quantity of the phosphite present in the initial reaction mixture is less on a molar basis than the quantity of phosphorohalidite and aldehyde. Whenever it is less, the 1:1:1 reaction product

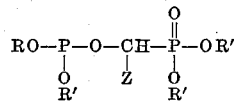

functions as a trivalent phosphorus ester, $P(OR')_3$, and reacts with the excess of halidite and aldehyde present. As shown schematically above, the product thus formed in turn functions as a trivalent phosphorus ester in the reaction with halidite and aldehyde so that, depending upon the available halidite and aldehyde, there are obtained polyphosphorus compounds of the formula

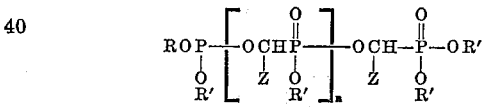

where $n$ is at least 1. The value of $n$ increases rapidly owing to the participation of the successively formed intermediate ester products, so that when there is present a large excess of the halidite and the aldehyde, or when these two reactants are constantly replenished, $n$ is a number of, say, from 1 to 100. Generally, the product consists of mixtures of compounds of the above formula in which there are present products wherein the value of $n$ varies.

Although a convenient means of preparing the presently used polyphosphorus compounds comprises employing, in an initial reaction mixture, less than an equimolar quantity of trivalent prosphorus ester with respect to the phosphorus halide and aldehyde, the polyphosphorus compounds can also be prepared by starting with a previously prepared 1:1:1 reaction product and adding the phosphorus halide and the carbonyl compound thereto. Thus, from a 1:1:1 mixture of a phosphorus halogen compound such as bis(2-chloroethyl) phosphoro-chloridite, an aldehyde such as propionaldehyde and a trivalent phosphorus ester such as triethyl phosphite there is obtained, according to the process of copending application, Serial No. 780,209, filed December 15, 1958, 1-(diethoxyphosphinyl)propyl bis(2-chloroethyl) phosphite,

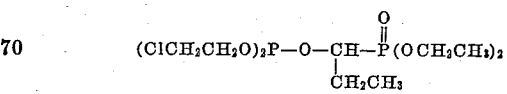

This compound can then be converted to one having a plurality of pentavalent phosphorus radicals by reacting it with additional quantities of the bis(2-chloroethyl)

phosphorochloridite and of the propionaldehyde to give the phosphite-polyphosphonate

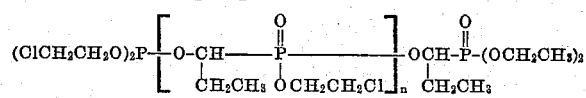

where $n$ is a number of at least 1. Or, instead of using the same trivalent phosphorus halide and the same aldehyde which was used for preparing 1-(diethoxyphosphinyl)propyl bis(2-chloroethyl)phosphite, there may be used a different trivalent phosphorus halide, e.g., 2-chloroethyl ethyl prosphorochloridite and a different aldehyde, e.g., benzaldehyde. In this case the reaction proceeds as follows:

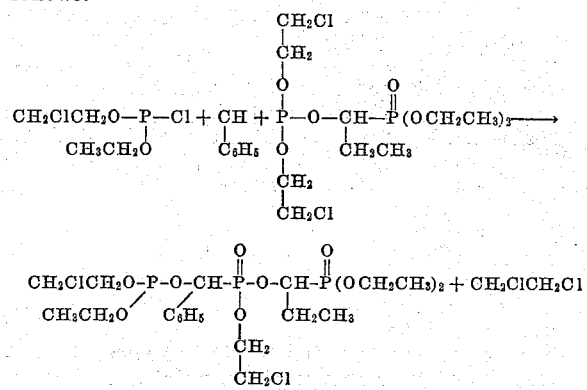

It is thus apparent that in the repeating units

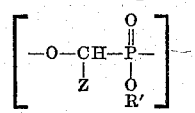

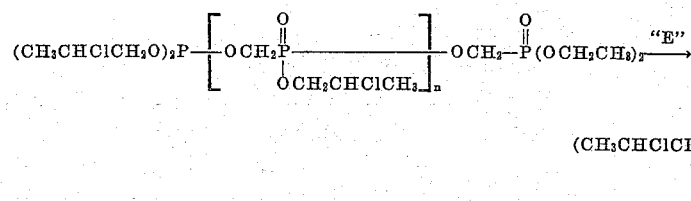

the substituents Z and R' need not be the same radical in all of the units of the polyphosphorus ester. Thus, there are obtainable a great diversity of compounds having a single trivalent phosphorus radical and one or more pentavalent phosphorus radicals which, according to this invention, are treated with an oxidizing agent or with sulfur to give compounds in which phosphorus is present only in the pentavalent form.

Depending upon the molar ratio of the halidite, the aldehyde and the ester $P(OR')_3$, the products obtained from mixtures of the three have the general formula:

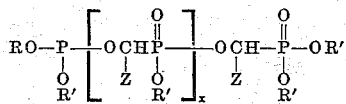

where $x$ is zero when equimolar quantities of the three reactants are employed and is at least one when the proportion of said ester is less than equimolar with respect to each of the other two reactants. Depending upon the ratio of the three reactants, the average value of $x$ may obviously be a number of between zero and one, i.e., the reaction mixture can consist of the 1:1:1 halidite-aldehyde-ester product in a mixture with products wherein $x$ is one or more. The phosphorus atom of the trivalent phosphorus ester portion of either of said 1:1:1 products or of the polyphosphorus compounds is converted by addition of oxygen or sulfur to a pentavalent phosphorus atom having oxygen or sulfur attached thereto without disturbing the linkages of that phosphorus atom. The general formula for the presently provided pentavalent phosphorus ester products being:

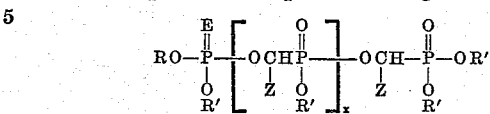

where $x$ denotes the average number of bracketed units, which number may be zero or more, and E denotes oxygen or sulfur.

As hereinbefore stated, the reaction products which are obtained from equimolar mixtures of the three reactants and those obtained from one mole of the halidite, one mole of the aldehyde and less than one mole of the ester are chemically converted according to the invention to give products wherein the phosphorus is present in only the pentavalent form, thus:

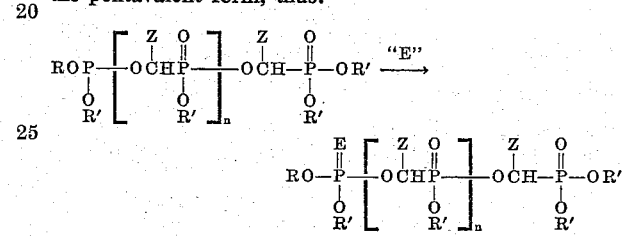

For example, the product obtained from one mole of bis-(2-chloropropyl) phosphorochloridite, one mole of formaldehyde and less than one mole of triethyl phosphite is converted by chemical oxidation or thionation to the phosphate-polyphosphonate, or phosphorothioate-polyphosphonate, respectively, thus:

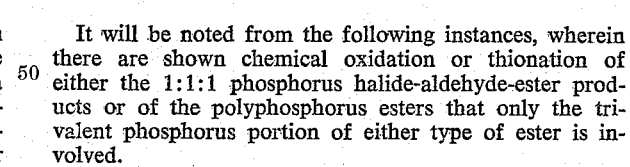

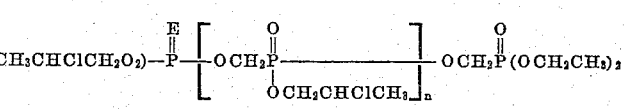

It will be noted from the following instances, wherein there are shown chemical oxidation or thionation of either the 1:1:1 phosphorus halide-aldehyde-ester products or of the polyphosphorus esters that only the trivalent phosphorus portion of either type of ester is involved.

A particularly valuable class of phosphates and phosphorothioates of this invention are those obtained by oxidizing or thionating phosphite-phosphonate materials prepared by reacting an aldehyde with a mixture of tris-(2-chloroethyl) phosphite and bis(2-chloroethyl) phosphorochloridite in 1:1:1 proportion. When the aldehyde used is an aliphatic aldehyde of from 2 to 18 carbon atoms, the phosphate-phosphonate or phosphorothioate-phosphonate products have the formula

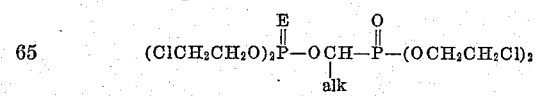

where alk denotes an alkyl or alkenyl radical of from 1 to 17 carbon atoms, E denotes an oxygen atom or sulfur atom, i.e., they are 1-[bis(2-chloroethoxy)phosphinyl]-alkyl bis(2-chloroethyl) phosphates or phosphorothioates. Examples of such compounds wherein the aldehyde radical is different in each case are:

1 - [bis(2 - chloroethoxy)phosphinyl]ethyl bis(2 - chloroethyl) phosphate or phosphorothiate, 1 - [bis(2 - chloroethoxy)phosphinyl]hexyl bis(2 - chloroethyl) phosphate or phosphorothioate,
1-[bis(2-chloroethoxy)phosphinyl]dodecyl bis(2-chloroethyl) phosphate or phosphorothioate,
1-[bis(2-chloroethoxy)phosphinyl]isobutyl bis(2-chloroethyl) phosphate or phosphorothioate,
1 - [bis(2 - chloroethoxy)phosphinyl] - 2 - ethylhexyl bis-(2-chloroethyl) phosphate or phosphorothioate,
1 - [bis(2 - chloroethoxy)phosphinyl] - 4 - butyloctyl bis-(2-chloroethyl) phosphate or phosphorothioate, and
1-[bis(2-chloroethoxy)phosphinyl]octadecyl bis(2-chloroethyl) phosphate or phosphorothioate Examples of phosphates and phosphorothioates obtained by oxidizing or thionating other phosphite-phosphonate materials prepared by treating mixtures of halogen-substituted tri-organo phosphites and halogen-substituted di-organophosphorohalidites with different aldehyde are:

α - [Bis(2 - bromoethoxy)phosphinyl]benzyl (bis(2-bromoethyl) phosphate or phosphorothioate,
1-[bis(2-chloropropoxy)phosphinyl]butyl bis(2 - chloropropyl) phosphate or phosphorothioate,
[bis(2-chlorobutoxy)phosphiny](cyclohexy)methyl bis-(2-chlorobutyl) phosphate or phosphorothioate,
1 - {bis[2 - chloro - 1 - (3-chloropropoxy)ethoxy]phosphinyl}butyl bis[2 - chloro-1-(3-chloropropoxy)ethyl] phosphate or phosphorothioate,
α[Bis(2 - bromo-3-butenyloxy)phosphinyl]-2-ethylbenzyl bis(2-bromo-3-butenyl) phosphate or phosphorothioate,
2-[bis(2,3 - dichloropropoxy)phosphinyl]-p-cyanobenzyl bis(2,3-dichloropropyl) phosphate or phosphorothioate,
1-[bis(2 - chloro - 3-isopropoxypropoxy)phosphinyl]-2-phenylethyl bis(2 - chloro - 3 - isopropoxypropyl) phosphate or phosphorothioate, 1-[bis(2 - chloro-2-phenylethoxy)phosphinyl]ethyl bis(2-chloro-2-phenylethyl) phosphate or phosphorothioate,
1-[bis(3 - isoamyl-2-chloropropoxy)phosphinyl]-4-carbomethoxybutyl bis(3-isoamyl-2-chloropropyl) phosphate or phosphorothioate,
α-[Bis(2,3 - dibromobutoxy)phosphinyl]furyl bis(2,3-dibromobutyl) phosphate or phosphorothioate,
1-[bis(2,3 - dichloroheptyloxy)phosphinyl]-4-cyanobutyl bis(2,3-dichloroheptyl) phosphate or phosphorothioate,
1{bis[2 - chloro-3-(2-chloroethyl)butoxy]phosphinyl}-3-propylthiopropyl bis[2-chloro-3-(2 - chloroethyl)butyl] phosphate or phosphorothioate, and
1-[bis(2 - chloro-7-octenyloxy)phosphinyl] - 6-methoxyhexyl bis(2-chloro-7-octenyloxy) phosphate or phosphorothioate Phosphate-phosphonate and phosphorothioate-phosphonate compounds having halohydrocarbyloxy groups attached to the phosphate or phosphorothioate phosphorus atom which are different from those attached to the phosphonate phosphorus atom are also within the scope of the invention.

Examples of such compounds are:

2 - [bis(2,3 - dicholorpropoxy)phosphinyl]benzyl bis(2-chloroethyl) phosphate or phosphorothioate,
1-[bis(2-chloroethoxy)phosphinyl]undecyl bis(2 - chloro-3-butenyl) phosphate or phosphorothioate,
1-[bis(3-methoxy-2 - chloropropoxy)phosphinyl]-3-cyanopropyl bis(3-phenoxy-2-bromopropyl) phosphate or phosphorothioate,
α-[Bis(2-bromobutoxy)phosphinyl]furyl bis(2 - chloro-3-ethoxybutyl) phosphate or phosphorothioate,
α[Bis(2-chloro-1-propylbutoxy)phosphinyl]thienyl bis(2,-3-dichlorohexyl) phosphate or phosphorothioate,
1-[bis(2 - bromo-3-chloropropoxy)phosphinyl]tetradecyl bis(2-chloropropyl) phosphate or phosphorothioate,
1-[bis(2 - chlorobutoxy)phosphinyl]-3-methylthiopropyl bis(2-chloroethyl) phosphate or phosphorothicate,
α-[Bis(2 - bromo-4-pentenyloxy)phosphinyl]-2 - chlorobenzyl bis(2-chloro-2-phenoxyethyl) phosphate or phosphorothioate,
1-[bis(2-chlorodecyloxy)phosphinyl]-4-ethoxybutyl bis(2-chloroethyl) phosphate or phosphorothioate, and
α-[Bis(2 - chloropropxy)phosphinyl]benzyl bis(2-chloroethoxy) phosphate or phosphorothioate.

When phosphite-polyphosphonate compounds are treated with an oxidizing agent, phosphate-polyphosphonate compounds are obtained, a few examples of which are:

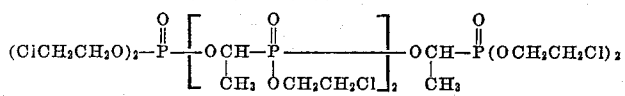

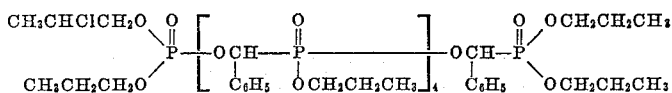

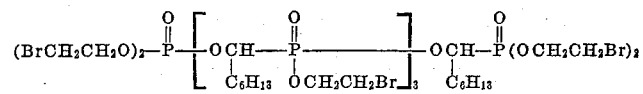

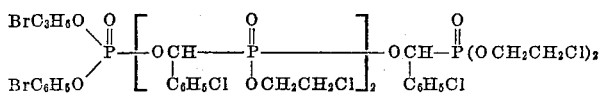

A few examples of compounds obtained when the respective phosphite-polyphosphonate compounds are thionated are:

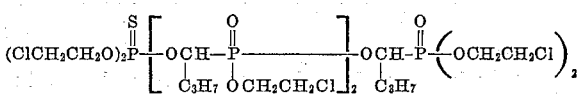

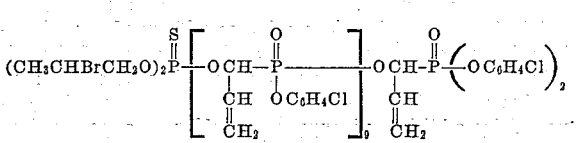

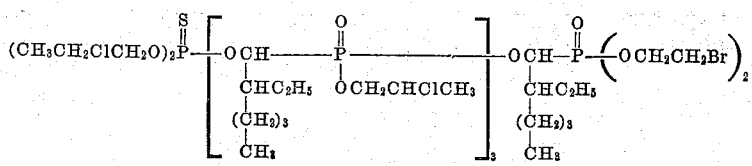

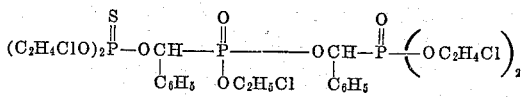

The above classes of compounds are all obtainable by treating the reaction product of (1) a halidite of the formula

wherein R is selected from the class consisting of haloalkyl, haloalkenyl, alkoxyhaloalkyl and aryloxyhaloalkyl radicals of from 1 to 12 carbon atoms, R' is selected from the class consisting of R, hydrocarbyl, and halohydrocarbyl radicals of from 1 to 12 carbon atoms and X is selected from the class consisting of chlorine and bromine, (2) an aldehyde of the formula ZCHO where Z is selected from the class consisting of hydrogen, hydrocarbyl, halohydrocarbyl, carboalkoxyhydrocarbyl, alkoxyhydrocarbyl, cyanohydrocarbyl, and alkylthiohydrocarbyl radicals of from 1 to 17 carbon atoms, and the thienyl and furyl radicals, and (3) a trivalent organic phosphorus ester of the formula

in which R' is as above defined, with an oxidizing agent or with sulfur.

An important class of phosphorus halogen compounds of the above formula are the phosphorohalidites, i.e., compounds of the formula (RO)$_2$PX. This includes the haloalkyl phosphorohalidites, e.g., bis(2-chloroethyl), bis(2-bromo-3-chloropropyl), bis(3-bromo-2-chloropropyl), bis (2,3-dichloropropyl), bis(2-bromopropyl), bis(tetrachloropropyl), bis(dichloroamyl), bis(dichlorododecyl), 2-chloroethyl methyl, allyl 2-bromopropyl, dibromohexyl butenyl, or 2-chloropropyl dodecyl phosphorochloridite or phosphorobromidite. Also useful are the haloalkenyl phosphorohalidites, e.g., bis(2-chloro-3-pentenyl) phosphorochloridite obtained by reaction of phosphorus trichloride with 4,5-epoxy-2-pentene.

The alkoxyhaloalkyl or aryloxyhaloalkyl phosphorochloridites obtained by reaction of glycidyl ethers with phosphorus trichloride or phosphorus tribromide are likewise very useful phosphorus-halogen reactants, as will be hereinafter disclosed.

Any of the above described trivalent phosphorus halogen compounds can be reacted with an aldehyde and a triorgano phosphite to give esters containing both trivalent and pentavalent phosphorus which upon treatment with an oxidizing agent or sulfur give the presently provided esters which contain phosphorus only in the pentavalent form. The useful aldehydes have the formula ZCHO wherein Z is selected from the class consisting of hydrogen, hydrocarbyl, halohydrocarbyl, carboalkoxyhydrocarbyl, alkylthiohydrocarbyl, alkoxyhydrocarbyl and cyanohydrocarbyl radicals of from 1 to 17 carbon atoms, and the thienyl and furyl radicals.

Owing to their easy availability, a particularly useful class of aldehydes includes the aliphatic aldehydes of from 1 to 18 carbon atoms, e.g., formaldehyde, acetaldehyde, acrolein, propionaldehyde, butyraldehyde, isobutyraldehyde, crotonaldehyde, valeraldehyde, isovaleraldehyde, hexanal, citronellal, heptanal, tiglic aldehyde, 2-ethylhexanal, octanal, 2-butyloctanal, propargaldehyde, 6-methylheptanal, amylpropiolic aldehyde, decanal, undecanal, 2-methylundecanal, lauraldehyde, stearaldehyde, tridecaldehyde, etc.

The presence of cyano, halogen, alkyl, carboalkoxy, alkoxy and alkylthio-substituents in the aliphatic aldehyde has no effect on the course of the reaction; hence, there may be employed such substituted aliphatic aldehydes as 3 - cyanopropionaldehyde, chloracetaldehyde, 3 - butoxybutyraldehyde, 4-cyano-2,2-dimethylbutyraldehyde, 2,3-dichloropropionaldehyde, chloral, 3-isopropoxypropionaldehyde, 3-(ethylthio)-3-methylbutyraldehyde, 2-methyl-3-fluoropropionaldehyde, dibromostearaldehyde, dichlorolauraldehyde, ethyl 11-formylundecanoate, succinaldehydic acid methyl ester, ethyl 4-formylbutyrate, diethyl formylsuccinate, iodoacetaldehyde, dichloroacetaldehyde, etc.

Presently useful alicyclic carboxaldehydes include cyclohexanecarboxaldehyde, 6-methyl-3-cyclohexenecarboxaldehyde, 2-cyclohexene-1-carboxaldehyde, cyclopentanecarboxaldehyde, 3-isopropyl-1-methylcyclohexanecarboxaldehyde, 5-ethoxy-3-cyclopentene-1-carboxaldehyde, 1-bromo-2,2,6 - trimethylcyclohexanecarboxaldehyde, 2,2,6-trimethylcyclohexanecarboxaldehyde, 2,2,6 - trimethyl - 2-cyclohexenecarboxaldehyde, 4 - chlorocyclohexanecarboxaldehyde, etc. The heterocyclic aldehydes include fufural and the thiophenecarboxaldehydes.

The presently useful benzenoid aldehydes may be aliphatic-aromatic or purely aromatic aldehydes which may or may not be further substituted, e.g., benzaldehyde, o-, m- or p-tolualdehyde, phenylacetaldehyde, dipentylbenzaldehyde, cinnamaldehyde, 1- or 2-napthaldehyde, biphenyl-4 - carboxaldehyde, α - phenylacrolein, hydrocinnamaldehyde, 2,3-dichlorobenzaldehyde, phenylproparagaldehyde, 2-, 3- or 4-butoxybenzaldehyde, o-, m- or p-chlorobenzaldehyde, p-(ethoxy)benzaldehyde, 2-ethoxybenzaldehyde, 3,4-dipropoxybenzaldehyde, 4-(n-butylthio) - benzaldehyde, o-, m- or p-iodobenzaldehyde, 3,4- or 3,5-dibromobenzaldehyde, 5-tert-butyl-m-tolualdehyde, 5-tert-butyl-3-fluoro-o-tolualdehyde, 2 - p - cymenecarboxaldehyde, 6-methoxy-2-naphthaldehyde, 2-butoxy-1 - naphthaldehyde, 4'-bromo-4-biphenylcarboxaldehyde, etc.

Triorgano phosphites which are generally useful with the aldehyde and the phosphorus halide to give the presently useful esters are either simple or mixed phosphites. Examples of useful phosphites are trimethyl, triethyl, triallyl, triisopropyl, tri-n-propyl, tri-2-butenyl, tri-n-butyl, tri-tert-amyl, tri-n-hexyl, tri-n-heptyl, tris-(2-ethylhexyl), trioctenyl, tri-n-octyl, trinonyl, tridecyl, triundecyl, tritert-dodecyl, tri-dodecenyl, amyl diethyl, butyl di-n-propyl, n-dodecyl dimethyl, ethyl octyl propyl, tris(2-chloroethyl), tris-(3-chloropropyl), tris(2-chloropropyl), tris(3,4-dichlorobutyl), tris(2-chloro-4-pentenyl), tris(2-bromoethyl), tris(3 - chloro-2-propenyl), tris(2-fluoroethyl), tris(dichlorododecyl), tris(2-ethoxyethyl), 2-chloroethyl diethyl, tris(2-phenoxypropyl), 3-bromopropyl bis(2-chloroethyl), diamyl trichlorooctyl, 2-chloroethyl 3 - chloropropyl 4 - chlorobutyl, 2-chloroethyl methyl propyl, tris(2,3-dichloropropyl), tris(2-bromo-3-chloropropyl), tris(2-chloro-3-methoxypropyl) and tris-(2-bromo-4-phenoxybutyl) phosphite.

The alkyl radical of a trialkyl phosphite, and halo derivatives thereof may also be one derived from a branched chain alcohol obtained according to the "Oxo" process by the reaction of carbon monoxide and hydrogen with a higher olefin, e.g., butylene dimer or propylene trimer.

The presently provided pentavalent phosphorus di- or polyesters are very conveniently prepared from the trivalent phosphorus-pentavalent phosphorus esters that are prepared by mixing together an aldehyde and the mixture of phosphorohalidite and phosphite which is obtained by reacting phosphorus trichloride or phosphorus tribromide with an oxirane compound. As disclosed in copending application, Serial No. 780,262, filed December 15, 1958, the reaction of two moles of phosphorus trichloride or phosphorus tribromide with five moles of an olefin oxide, e.g., ethylene oxide, results in the production of an equimolar mixture of a phosphorochloridite and a tribasic phosphite, thus:

$$2PCl_3+5CH_2\text{—}CH_2\rightarrow(CH_2ClCH_2O)PCl+P(OCH_2CH_2Cl)_3$$

However, when there is used with the two moles of phosphorus trichloride a quantity of alkylene oxide which is less than five moles, but greater than four moles, the reaction product contains less of tribasic phosphite than of phosphorochloridite. For example, using 2 moles of phosphorus trihalide and 4.98 moles of alkylene oxide, the reaction product consists essentially of 0.98 mole of tribasic phosphite and 1.02 moles of phosphorohalidite. Using 2 moles of phosphorus trihalide and 4.95 moles of alkylene oxide, the reaction product consists of about 0.95 mole of phosphite and 1.05 moles of the halidite. As the number of moles of the alkylene oxide per 2 moles of phosphorus trichloride approaches 4, there is an increasingly greater content of phosphorohalidite in the reaction product. The variation of halidite to ester ratio in the reaction product of an alkylene oxide and phosphorus trihalide is shown below.

| Moles of alkylene oxide per 2 moles of PCl₃ or PBr₃ | Moles of halidite in product per mole of phosphite |
|---|---|
| 4.80 | 1.5 |
| 4.67 | 2.0 |
| 4.50 | 3.0 |
| 4.40 | 4.0 |
| 4.33 | 5.0 |
| 4.29 | 6.0 |
| 4.25 | 7.0 |
| 4.17 | 11.0 |
| 4.09 | 21.0 |

The average number of units $$\left[\begin{array}{c}\text{O}\\\|\\-\text{O}-\text{CH}-\text{P}-\\|\quad\quad|\\Z\quad\quad R'\end{array}\right]$$

in the polyphosphorus compounds obtained by reacting the phosphite-halidite mixture with an aldehyde in a quantity which is at least equimolar with respect to the halidite increases with increasing halidite ratio. When the phosphite to halidite ratio is 0.98:1.02, the reaction product consists of about 96% on a molar basis of the 1:1:1 halidite-aldehyde-ester compound (which has none such unit) and about 4% on a molar basis of a compound having one such unit. When the phosphite to halidite ratio is 0.95:1.05, the reaction product consists of about 89.5% on a molar basis of a compound having none such units and about 10.5% on a molar basis of a compound having one such unit. As the halidite content of the phosphorus trichloride-alkylene oxide reaction product increases, the number of said units in the product obtained therefrom by reaction with an aldehyde increases, as is apparent from the table below:

| Molar ratio of halidite to phosphite | Average number of repeating units in aldehyde product |
|---|---|
| 1.02:0.98 | 0.04 |
| 1.05:0.95 | 0.1 |
| 1.5:1 | 0.5 |
| 2:1 | 1.0 |
| 3:1 | 2.0 |
| 4:1 | 3.0 |
| 5:1 | 4.0 |
| 6:1 | 5.0 |
| 7:1 | 6.0 |
| 11:1 | 10.0 |
| 21:1 | 20.0 |

It will thus be noted that as the halidite content of the phosphorus trichloride-alkylene oxide reaction mixture increases, the number of said units in the polyphosphorus compounds appears to increase asymptotically. Thus from a 1:101 phosphite-halidite mixture, the calculated average number of said units in the polyphosphorus compound is 100. For practical purposes and in order to obtain products of value for presently desired industrial applications, it is preferred to operate in such a manner that the average number of said units is, say, from 1 to 10, and more advantageously from 1 to 4.

As will be apparent to those skilled in the art the term "average units" when applied to repetitive portions of a high molecular weight composition indicates a mixture in which there is present varying numbers of such units. Hence in a composition which is stated to have, say, an average of 10 repeating units there will be present compounds having less than 10 such units as well as compounds having more than 10 units.

It is thus apparent that so long as there is employed in the reaction with the aldehyde a mixture of phosphorohalidite and tribasic phosphite which is prepared by reaction of two moles of phosphorus trihalide with more than four but less than five moles of alkylene oxide, and the quantity of aldehyde used is at least equimolar with respect to the phosphorohalidite content of the so obtained trihalide-alkylene oxide reaction product, there is present in the final reaction product a substantial quantity of phosphite-polyphosphonate.

Oxirane compounds suitable for reaction with the phosphorus trichloride or phosphorus tribromide to yield mixtures of phosphite and phosphorochloridite that are reacted with an aldehyde to give the compounds which are presently oxidized are, e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2 - epoxyheptane, 2,3 - epoxy - 3 - ethylpentane, 1,2 - epoxy - 2,4,4 - trimethylpentane, 1,2 - epoxy - 2,3-dimethylheptane; haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 1,2-epoxy-3,4-dibromobutane, 2,3-epoxy-1-bromopentane, 3,4 - epoxy - 2-chlorohexane, 1,2-epoxy-3,3,3-trifluoropropane, 1-bromo-2,3-epoxyheptane; the alkenyl-substituted oxiranes such as 3,4-epoxy-4-methyl-1-pentene and 3,4-epoxy-1-butene; aryl-substituted oxiranes such as (epoxyethyl)benzene, (1,2-epoxy-1-methylethyl)-benzene, (3-chloro-1,2-epoxypropyl)benzene; alkoxyalkyl- and phenoxyalkyl-substituted oxiranes such as the methyl, ethyl, isopropyl, isoamyl and phenyl ethers of glycidol, i.e., compounds of the formula

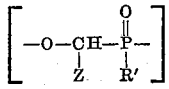

where R is methyl, ethyl, isopropyl, amyl or phenyl; (2-ethoxyethyl)-ethylene oxide, etc.

Reaction of two moles of phosphorus trichloride or of phosphorus tribromide with five moles or with more than four but less than five moles of the presently useful substituted oxiranes gives, by way of example, mixtures of the following phosphites and phosphorohalidites which are advantageously reacted with an aldehyde to give presently useful trivalent phosphorus-pentavalent phosphorus esters:

I. Tris(2-chloroethyl) phosphite and bis(2-chloroethyl) phosphorochloridite
II. Tris(2,3-dichloropropyl) phosphite and bis(2,3-dichloropropyl) phosphorochloridite
III. Tris(2-chloropropyl) phosphite and bis(2-chloropropyl) phosphorochloridite
IV. Tris(2-bromoethyl) phosphite and bis(2-bromoethyl) phosphorobromidite V. Tris(2-bromopropyl) phosphite and bis(2-bromopropyl) phosphorobromidite
VI. Tris(2,3-dibromopropyl) phosphite and bis(2,3-dibromopropyl) phosphorobromidite
VII. Tris(3-bromo-2-chloropropyl) phosphite and bis(3-bromo-2-chloropropyl) phosphorochloridite
VIII. Tris(2-bromo-3-chloropropyl) phosphite and bis(2-bromo-3-chloropropyl) phosphorobromidite
IX. Tris(2-chlorobutyl) phosphite and bis(2-chlorobutyl) phosphorochloridite
X. Tris(2-bromobutyl) phosphite and bis(2-bromobutyl) phosphorobromidite
XI. Tris(2-chloro-1-methylpropyl) phosphite and bis(2-chloro-1-methylpropyl) phosphorochloridite
XII. Tris[(1-chloromethyl)butyl] phosphite and bis[(1-chloromethyl)butyl] phosphorochloridite
XIII. Tris[(1-bromoethyl)-tert-amyl] phosphite and bis[(1-bromoethyl)-tert-amyl] phosphorobromidite
XIV. Tris[(α-chloromethyl)benzyl] phosphite and bis[(α-chloromethyl)benzyl] phosphorochloridite
XV. Tris(2-chloro-2-phenylethyl) phosphite and bis(2-chloro-2-phenylethyl) phosphorochloridite
XVI. Tris(2-bromo-2-methyl-2-phenylethyl) phosphite and bis(2-bromo-2-methyl-2-phenylethyl) phosphorobromidite
XVII. Tris(2-chloro-3-butenyl) phosphite and bis(2-chloro-3-butenyl) phosphorochloridite
XVIII. Tris(2-chloro-2-ethylhexyl) phosphite and bis(2-chloro-2-ethylhexyl) phosphorochloridite
XIX. Tris(3-methoxy-2-chloropropyl) phosphite and bis(3-methoxy-2-chloropropyl) phosphorochloridite
XX. Tris(3-phenoxy-2-bromopropyl) phosphite and bis(3-phenoxy-2-bromopropyl) phosphorobromidite
XXI. Tris(2-chloro-4-ethoxybutyl) phosphite and bis(2-chloro-4-ethoxybutyl) phosphorochloridite
XXII. Tris(3-bromo-2-chloropropyl) phosphite and bis(3-bromo-2-chloropropyl) phosphorochloridite Since reaction of the oxirane compound with the phosphorus trihalide proceeds through opening of the oxirane ring, there may be present in the above mixtures minor amounts of isomeric phosphite and isomeric phosphorohalidite, e.g., while in the reaction of phosphorus trichloride and propylene oxide the oxirane ring opens with preferential formation of tris(2-chloropropyl) phosphite and bis(2-chloropropyl) phosphorochloridite there may also be formed small quantities of tris(1-methyl-2-chloroethyl) phosphite and bis(1-methyl-2-chloroethyl) phosphorochloridite. The isomer content, if any, of the reaction mixture is of no consequence for the present purpose because the isomers also react with the carbonyl compound to give phosphite-phosphonates. While the small quantity of isomeric phosphite-phosphonate present in the final reaction product may be considered to constitute an impurity, it is not detrimental in practical application for the isomers are so closely related that they possess substantially the same utility. Thus, the content of, say a small quantity of 1-[bis(2-chloro-1-methylethoxy)phosphinyl]ethyl bis(2-chloro-1-methylethyl) phosphite which may be present along with the 1-[bis(2-chloropropoxy)phosphinyl]ethyl bis(2-chloropropyl) phosphite in the reaction product of acetaldehyde and the mixture of phosphite and phosphorochloridite obtained from two moles of phosphorus trichloride and more than four but less than five moles of propylene oxide, generally does not limit the utility of the latter. However, if desired, the isomeric impurity may be separated by generally known isolating procedures, i.e., chromatography, crystallization, etc.

Reaction of the phosphorus trichloride or phosphorus tribromide with the presently useful oxirane compounds takes place readily, generally, by simply mixing the phosphorus halide with the oxirane compound in the appropriate ratio. Depending on the nature of the individual reactants, heating may or may not be required. The use of catalytic amounts of an acidic agent, e.g., hydrogen chloride or a compound which produces hydrogen chloride under the reaction conditions, e.g., ethylene chlorohydrin, is advantageous. Usually the reaction is exothermic, whereby cooling in order to maintain smooth reaction is advantageous. It is recommended that in such exothermic reactions the temperature not be allowed to rise above, say, from 60° C. to 80° C. An inert diluent may or may not be employed. When no diluent is used and there has been employed two moles of the phosphorus halide with more than four but less than five moles of the oxirane compound, the product consists of the halogenated triorgano phosphite and more than a molar equivalent of the halogenated diorgano phosphorohalidite. Hence, no isolating procedure is required before reaction with the aldehyde for preparation of the presently provided phosphite polyphosphonates. Noting cessation of change in refractive index, or of heat evolution in the case of exothermic reactions, or of change in viscosity of the reaction mass will suffice to determine when all of the initial reactants have been consumed.

When formaldehyde is employed with a mixture of a phosphorohalidite and phosphorus ester obtained from two moles of phosphorus trihalide and either five moles or more than four but less than five moles of an alkylene oxide, the trivalent phosphorus-pentavalent phosphorus esters have the formula

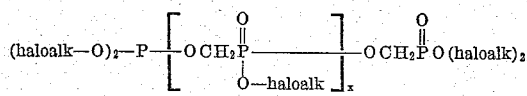

where haloalk denotes a haloalkyl radical of from 2 to 12 carbon atoms and $x$ is zero or greater. When the aldehyde is an aliphatic aldehyde, the products obtained from a mixture of phosphorohalidite like bis(2-chloropropyl)phosphorochloridite and a phosphorus ester like tris(2-chloropropyl) phosphite have the formula:

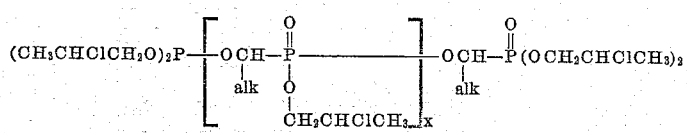

in which alk denotes an alkyl radical of from 1 to 17 carbon atoms, and $x$ is zero or greater. When the same reaction product of propylene oxide and phosphorus trichloride is treated with an aromatic aldehyde the products have the formula:

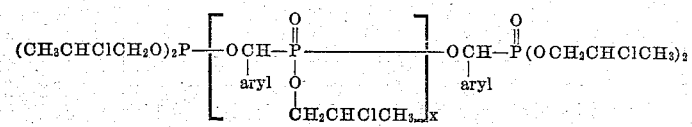

in which aryl denotes an aromatic hydrocarbon radical and $x$ is zero or greater.

Reaction of the trivalent phosphorus halogen compound, the aldehyde and the trivalent phosphorus ester in the above stated proportions takes place readily by contacting the three reactants at ordinary or moderately decreased or increased temperatures and allowing the resulting reaction mixture to stand until formation of the trivalent phosphorus-pentavalent phosphorus ester. Thus, the phosphorus halogen compound may be mixed with the phosphorus ester in the appropriate ratio or a mixture thereof may be prepared from a phosphorus trihalide and an oxirane compound as disclosed above, and the aldehyde may be added to the resulting mixture. Or, if desired, the aldehyde and the phosphorus ester may first be mixed and the phosphorus halogen compound added thereto. Because the reaction may be exothermic, gradual contact of the reactants is usually recommended in order to obtain smooth reaction. However, as will be apparent to those skilled in the art, the exothermal nature of the reaction becomes less of a factor as the molecular weight of the reactants, and particularly of the phosphorus-containing reactant is increased. Also, when the aldehyde is either a higher alkanecarboxaldehyde or an aralkyl or alkaryl aldehyde, reaction is generally not so rapid as it is with the lower aliphatic aldehydes or with benzaldehyde. It is thus recommended that in each initial run, the three reactants be mixed gradually at low temperatures and that external heating be employed only when there appears no spontaneous increase in temperature as a consequence of the mixing. In most instances, the reaction is mildly exothermic initially. Whether the reaction goes to completion without the use of extraneous heat is determined by the nature of the reactants. Completion of the reaction, in any event, can be readily ascertained by noting cessation in change of viscosity, refractive index, or the quantity of by-product halide. Using the lower alkane-carboxaldehydes, which aldehydes are generally very reactive, external cooling is usually advantageous. When working with such active aldehydes, optimum conditions comprise gradual addition of the aldehyde to the mixture of phosphite and phosphorus-halogen compound with application of external cooling and thorough stirring. Usually it suffices to maintain the reaction temperature at, say, from 10° C. to 50° C. during addition of the aldehyde. When all of the aldehyde has been added to said mixture and there is no longer any evidence of exothermic reaction, completion of the reaction may be assured by heating the reaction mixture to a temperature of from, say, 50° C. to 150° C., depending upon the nature of the reactants. With the more sluggish aldehydes, e.g., 2-phenylacetaldehyde or lauraldehyde, it may be necessary to heat the reaction mixture moderately, say to a temperature of about 50° C. before an exothermic reaction is initiated. Employing naphthaldehyde as the aldehyde reactant and a high molecular weight phosphite and phosphorus-halogen compound, even higher temperatures may be required, e.g., temperatures of from 100° C. to 150° C. appear to give the best yields.

As stated above, formation of the desired product, i.e., the trivalent phosphorus-pentavalent phosphorus ester is accompanied by the formation of a halogenated alkane as a by-product. Thus the reaction of, say, bis(2-chloropropyl) phosphorochloridite, acetaldehyde and triethyl phosphite gives ethyl chloride as a by-product:

(CH₃CHClCH₂O)₂PCl+CH₃CHO+(CH₃CH₂O)₃P⟶

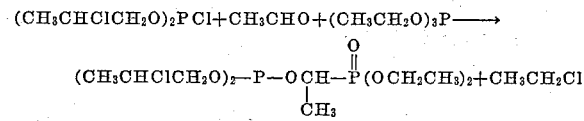

The by-product halide is readily removed from the desired product by volatilization. However, in many instances, the by-product halides are articles of commerce for which many applications exist. Thus, while many currently employed processes for the manufacture of organic compounds of phosphorus entail substantial waste of halogen in that by-products of little commercial importance are often formed, in the present instance when starting from the phosphorus trihalide-oxirane reaction products, all of the halogen constituent of the raw materials is converted into products of economic importance. Although the by-product halide may be removed prior to the treatment of the phosphite-phosphonate or phosphite-polyphosphonate material with an oxidizing agent or with sulfur, such removal step is not necessary since the by-product does not interfere with the oxidation or thionation reactions. Furthermore, for many applications, the presence of the by-product halide in the pentavalent phosphorus product enhances the usefulness of the product. For example, when the pentavalent phosphorus product is to be used as a gasoline additive, the by-product halogenated alkane, mixed therewith, serves as a good lead scavenger in the gasoline.

Reaction of the phosphorus halogen compound, the aldehyde and the trivalent phosphorus ester to give the presently useful trivalent phosphorus-pentavalent phosphorus esters is readily conducted in the presence or absence of inert diluents or solvents. The use of diluents may be particularly advantageous when working with the highly active aldehydes; such diluents may be e.g., benzene, toluene, chloroform, methylene chloride or hexane.

As herein stated, conversion of the trivalent phosphorus reaction product into the totally pentavalent phosphorus ester proceeds according to the scheme:

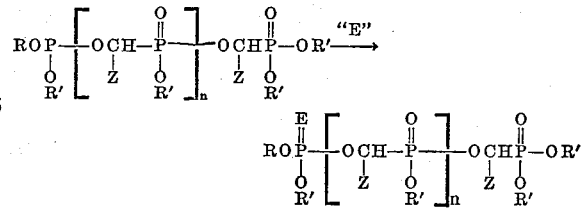

where $n$ is zero or greater and "E" denotes the oxidizing or thionating agent.

In the case of the 1:1:1 bis(2-chloroethyl) phosphorochloridite-acetaldehyde-tris(2-chloroethyl) phosphite reaction product the oxidation of thionation takes place as follows:

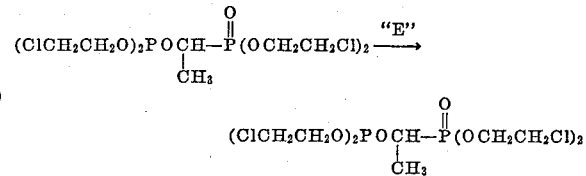

In oxidizing the phosphite-phosphonate materials to the corresponding phosphate-phosphonate compounds, I have found that a wide variety of chemicals oxidize the trivalent phosphite phosphorus atom of the present phosphite-phosphonates to a pentavalent phosphate phosphorus atom without disturbing the other groups attached thereto. Some of those oxidizing agents which are preferred for use in making the compounds of this invention are the peroxy-carboxylic acids, both aromatic and aliphatic, hydroperoxides, hydrogen peroxide, ozone, oxygen, and nitrogen oxides such as nitrogen tetroxide. Air may be used but it is not preferred. Although the more common inorganic oxidizing agents, such as KMnO₄, CrO₃, etc., would accomplish the oxidation, they are not desirable for reasons of expense, salt by-product complications, etc. To prepare the phosphorothioate-phosphonate compounds of this invention, elemental sulfur is preferably used. In either case, i.e., whether the phosphate or phosphorothioate products are being prepared, the phosphite-phosphonate material is usually contacted with a stoichiometric amount or slight excess of oxidizing or thionating agent while stirring the mixture. Any excess of oxidizing or thionating agent can easily be recovered by known physical means, e.g., filtration, volatilization, extraction, etc.

Reaction of the phosphite-phosphonate materials and the oxidizing agent or sulfur can take place readily at room temperature. However, in the case of the highly active oxidizing agents it is often preferred to cool the mixture to, say, from about −70° C. to 20° C. to control the speed of the resulting exothermic reaction. On the other hand, the reaction with sulfur is most practically accomplished by heating the mixture to, say, from 50° to 100° C. to initiate the reaction and then to a higher temperature of from 130° to 180° C. to insure completion of the reaction.

The oxidation or thionation of the phosphite-phosphonate materials is readily conducted in the absence of an inert diluent, solvent, or catalyst. However, diluents or solvents and catalysts may be employed. The use of diluents or solvents may be particularly advantageous when working with the highly active oxidizing agents or the more viscous phosphite-phosphonate materials. Such diluents may be, e.g., benzene, toluene, dioxane, alkylene halides such as methylene chloride and methylene bromide, hexane, and mixtures thereof. Although no particular order of contacting the phosphite-phosphonate and phosphite-polyphosphonate materials and the oxidizing agent or sulfur need be observed, it is preferred to add the oxidizing agent or sulfur to the phosphite-phosphonate or phosphite-polyphosphonate portionwise to avoid unduly exothermic reactions and to avoid waste of reactants.

As disclosed in the previously referred to patent applications, the halidite-aldehyde-trivalent phosphorus reaction products, e.g., compounds like the 1-[bis(haloalkoxy)phosphinyl]hydrocarbyl bis(haloalkyl) phosphites obtained from a 1:1:1 molar ratio of the three reactants or the polyphosphorus compounds obtained when the ester is present in a quantity which is less than equimolar, are useful for a variety of agricultural and industrial purposes. The presently provided compounds are useful in substantially the same fields of application; however, being more stable to hydrolysis than are the starting materials, i.e., the trivalent phosphorus-pentavalent phosphorus esters from which they are prepared, the presently provided exclusively pentavalent phosphorus esters will be preferred in some of these applications.

The presently provided products are generally high-boiling, stable materials which range from viscid liquids to waxy or crystalline solids. While the utility of the whole class of the present compounds will range somewhat with the nature of each of the three reactants, the presently provided products are generally useful as lubricant and gasoline additives, as biological and agricultural toxicants, as rubber compounding chemicals, and as adjuvants for synthetic resins and plastics. They are very valuable as flame-proofing agents for cellulosic and carbonaceous combustible materials generally.

In applications relating to synthetic resins and plastics, the present polyphosphorus esters are surprisingly useful in that not only do they impart flame-resistant characteristics thereto, but they also frequently demonstrate plasticizing and stabilizing effects. They are compatible over a wide concentration range with a great variety of resinous materials. They are advantageously employed in the preparation of improved synthetics such as the phenolic, polyester, polyamide, and cellulose ester resins, in the vinyl polymers such as polyvinyl chloride, the polyvinyl acetals, polystyrene, polyethylene, vinyl chloride-vinyl acetate copolymers, olefin-maleic anhydride copolymers, polybutadiene and the copolymer elastomers such as butadiene-styrene or butadiene-acrylonitrile copolymers, etc. They are also very effectively used in the preparation of foamed resins, e.g., polystyrene foam or of polyester foams, such as polyethylene terephthalate, or the polyurethanes. Thus, use of the polyphosphorus compound with the required diisocyanate component and required hydroxy component in a quantity of, say, up to 40% or even 50% of the mix gives foamed products which not only are flame-proofed but which also have been compatibily plasticized.

Many of the presently provided products, particularly those that contain a plurality of the pentavalent phosphorus ester groups, are useful as functional fluids in electrical and force-transmitting applications. Being stable at high temperatures, substantially unaffected by moisture and either acidic or alkaline agents, and remaining liquid over a wide range of temperature conditions, they are generally useful in force-transmitting applications, e.g., as lubricants, as antifreeze compositions and as hydraulic fluids. They can be used alone for such purposes or mixed with other materials known in the art to be effective for these purposes, e.g., partially chlorinated biphenyls, alkylated polystyrenes, polyacrylates, etc. The present products are also useful as modifying agents for hydrocarbon oil lubricants, e.g., as lubricity improving agents.

Those of the presently prepared compounds which are gasoline-soluble are particularly useful as stable preignition additives for leaded gasolines. The invention thus provides an improved fuel for spark ignition internal combustion engines which consists essentially of gasoline, an organo lead anti-knock and the gasoline-soluble phosphate-phosphonate or phosphorothioate-phosphonate product, said product being present in said fuel in a quantity sufficient to suppress preignition of the fuel.

Preignition is the ignition of the combustible mixture of air and fuel prior to firing by the spark plug. This occurs when deposits of readily glowing material build up in the combustion chamber. When the fuel is a gasoline containing an organolead anti-knock together with a halohydrocarbon scavenger, such readily glowing deposits comprise carbon in a mixture with lead halides; the latter acting to reduce the normal ignition temperature of carbon. Since reduction of the ignition temperature tends to increase with increasing concentration of the organolead anti-knock, preignition is a problem which becomes particularly troublesome as use of high compression engines becomes more prevalent. The deposits of carbon and lead salt retain sufficient heat from the previous firing cycle in enough quantity to permit them to glow, and if the glowing period (which depends on ease of ignition, and hence the lead content of the deposit) is long enough, the fuel is fired in the next cycle before it can be fired by the spark plug. The erratic firing which thus results is demonstrated by a "wild ping" or a dull thudding knock. It is generally accompanied by increased detonation, spark-plug fouling, and reduction of exhaust valve life.

It has now been found that preignition and the various difficulties consequent thereto can be substantially suppressed or entirely eliminated by incorporating the gasoline-soluble pentavalent di- or polyphosphorus compound into the leaded gasoline in a preignition-inhibiting quantity. Such a quantity of course, will depend upon the content of organo-lead compound and halohydrocarbon scavenger in the fuel. Leaded gasolines usually contain an anti-knocking quantity of an organo-lead compound such as tetraethyllead, tetramethyllead, dimethyldiethyllead, and tetraphenyllead and substantially the amount of hydrocarbon halide scavenger, say, ethylene dibromide, ethylene dichloride, acetylene tetrabromide, or mono- or polyhalopropane, butane, or pentane, or polyhaloalkyl benzene, which is calculated to react with the organolead compound to give a lead halide, e.g., lead bromide when the organolead compound is tetraethyllead and the halohydrocarbon is ethylene dibromide. The quantity of the present compound which will suppress preignition of the leaded hydrocarbon fuel will depend upon the quantity of lead present in the fuel.

The invention is further illustrated by, but not limited to, the following examples.

EXAMPLE 1

A substantially equimolar mixture of tris(2-chloroethyl) phosphite and bis(2-chloroethyl) phosphorochloridite was prepared as follows:

In a reaction flask fitted with a mechanical stirrer, thermometer, a trap-equipped condenser, and a gas inlet tube, there was placed 275 g. (2.0 moles) of phosphorus trichloride. After cooling the trichloride to 10° C., ethylene oxide was introduced below the liquid surface through said tube. During the first 0.2 hour of ethylene oxide flow, the temperature of the reaction mixture increased to 19° C., and as the reaction became more exothermic, cooling by means of an ice-salt bath was employed to maintain the temperature below 24° C. Introduction of the ethylene oxide was continued for a total of 1.25 hours, at the end of which time a total of 223 g. (5.0 moles) of the oxide had been added. The resulting colorless reaction mixture was warmed to 44° C. and maintained under water-pump vacuum at 44° C.–41° C. for a short time. There was thus obtained 498 g. of a substantially equimolar mixture of tris-(2-chloroethyl) phosphite and bis(2-chloroethyl) phosphorochloridite.

To 243.8 g. of the above mixture consisting of bis(2-chloroethyl) phosphorochloridite and tris(2-chloroethyl) phosphite there was added, during 0.3 hour, 30.8 g. (0.7 mole) of acetaldehyde. During addition of the aldehyde, the temperature of the reaction mixture was maintained by ice-cooling at 10–15° C. After all of the aldehyde had been added, cooling was required for several minutes in order to maintain the temperature of the mixture below 20° C. It was then stirred at room temperature for one hour and allowed to stand overnight. Concentration to a pot temperature of 102° C./1.0 mm., gave as residue 219 g. (100% of theoretical yield) of the substantially pure 1-[bis(2-chloroethoxy)phosphinyl]ethyl bis(2-chloroethyl) phosphite, $n_D^{25}$ 1.4904, of the structure,

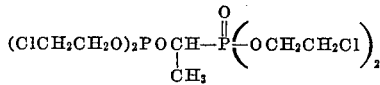

A 108 g. portion of 1-[bis(2-chloroethoxy)phosphinyl]ethyl bis(2-chloroethyl) phosphite prepared as indicated above was placed in a 500 ml. flask and cooled in ice as ozone (0.18 mole/hour) was passed in through the stirrer. The temperature increased from 10° to 20° C. To aid mixing, 100 ml. of methylene chloride was added. The flow of ozone was continued for two hours. The product was transferred to a distillation flask and concentrated to 138° C./0.2 mm. There was no distillate. The residue, 1-[bis(2-chloroethoxy)phosphinyl]ethyl bis-(2-chloroethyl) phosphate, weighed 110.2 g. and analyzed as follows:

|  | Found | Calculated for $C_{10}H_{20}Cl_4P_2O_7$ |
|---|---|---|
| Percent C | 26.77 | 26.20 |
| Percent H | 4.39 | 4.36 |
| Percent Cl | 29.65 | 31.00 |

Nuclear magnetic resonance measurements for phosphorus showed that the trivalent phosphorus of the phosphite-phosphonate intermediate was completely converted to the pentavalent phosphate state.

EXAMPLE 2

Samples of the following three phosphite-phosphonate materials were oxidized by using ozone according to the procedure described below.

(1) 1-[bis(2-chloroethoxy)phosphinyl]ethyl bis(2-chloroethyl) phosphite.

(2) α-[Bis(2-chloroethoxy)phosphinyl]benzyl bis(2-chloroethyl) phosphite.

(3) 1-[bis(2-chloropropoxy)phosphinyl]-2-ethylhexyl bis(2-chloropropyl) phosphite.

One hundred millimoles of the ester was dissolved in dry methylene chloride and this solution was cooled to about −50° to −60° C. Ozone was then added at the rate of 0.70 millimole/minute until ozone began coming through the solution and into a potassium iodide trap on the off-gas side of the apparatus. To assure complete oxidation, the ozone was maintained for an additional minute or so until the characteristic blue color of ozone was apparent in the reaction vessel. Excess ozone was then sparged out with nitrogen and the solution was allowed to warm to room temperature. The methylene chloride was removed by heating the solution under water pump vacuum. The residual oxidized material was held at 100° C. under vacuum for about 30 minutes to an hour. The data for each compound is summarized in Table 1.

Table 1

| Compound | Wt. (g.) Phosphite (100 millimoles) | Millimoles $O_2$ absorbed | Wt. (g.) of Phosphate |
|---|---|---|---|
| 1 | 44.0 | 46.5 | 45.5 |
| 2 | 50.2 | 54.1 | 52.4 |
| 3 | 58.0 | 58.0 | 59.7 |

EXAMPLE 3

2-ethylhexaldehyde (64.1 g., 0.50 mole) was added with cooling during a 0.2 hour period to 245 g. of a substantially equimolar mixture of bis(2-chloroethyl) phosphorochloridite and tris(2-chloroethyl) phosphite (prepared as described in Example 1). The exothermal nature of the reaction was evidenced by the fact that the temperature of the reaction mixture increased to 43° C. when all of the aldehyde had been added and ice-cooling was discontinued. The reaction mixture was then warmed at 95–103° C. for a period of 0.3 hour and concentrated at reduced pressure to remove by-products.

A 51.5 g. (0.098 mole) portion of 1-[bis(2-chloroethoxy)-phosphinyl]-2-ethylhexyl bis(2-chloroethyl) phosphite prepared as indicated above was placed in a 500 ml. flask and stirred. The addition of a small portion of 16.7 g. of 30% hydrogen peroxide (5.0 g., 0.147 mole) as $H_2O_2$ caused a rapid temperature rise from 20° to 50° C. The major portion of hydrogen peroxide addition was made with cooling at 10°–15° C. The mixture was stirred at room temperature for 0.75 hour, and warmed to 40° C. About 75 ml. of methylene chloride was added. The organic layer was separated and dried. After standing overnight, the mixture was filtered and the filtrate concentrated to 140° C./0.2 mm. to give a light yellow residue, 1-[bis(2-chloroethoxy)phosphinyl]-2-ethylhexyl bis(2-chloroethyl) phosphate.

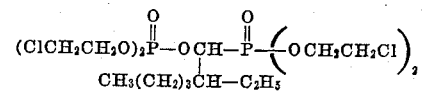

EXAMPLE 4

A 105 g. (0.239 mole) portion of 1-[bis(2-chloroethoxy)phosphinyl]ethyl bis(2-chloroethyl) phosphite prepared as in example 1 above was placed in a 500 ml. flask and stirred as 6.3 g. of sulfur was added. The solution was warmed at 120°–125° C. for one hour and then placed under vacuum (5 mm.) as the solution cooled to give as residue an amber colored liquid product, $n_D^{25}$ 1.4989, which was 1-[bis(2-chloroethoxy)phosphinyl]ethyl bis(2-chloroethyl) phosphorothioate.

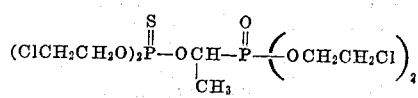

EXAMPLE 5

An 83.2 g. (0.159 mole) portion of 1-[bis(2-chloropropoxy)phosphinyl]butyl bis(2-chloropropyl) phospite, prepared by reacting n-butyraldehyde with an equimolar mixture of bis(2-chloropropyl)phosphorochloridite and tris(2-chloropropyl) phosphite, and 2.5 g. of sulfur were placed in a 500 ml. flask, stirred and warmed. The reaction mixture became clear and colorless after 0.2 hour at 105°–110° C. Another 1.2 g. of sulfur was added, and warming was continued at 110°–125° C. for 0.5 hour to give a colorless liquid product which was substantially 1-[bis(2-chloropropoxy)phosphinyl - butyl]bis(2-chloropropyl) phosphorothioate.

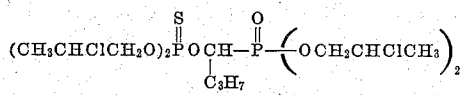

EXAMPLE 6

A 510.2 g. (1.0 mole) portion of 1-[bis(2-chloropropoxy)phosphinyl]propyl bis(2-chloropropyl) phosphite, prepared by reacting propionaldehyde with an equimolar mixture of bis(2-chloropropyl)phosphorochloridite and tris(2-chloropropyl) phosphite, and 24.0 g. of sulfur flowers were placed in a 1 liter flask and warmed to about 50° C. at which temperature there was a mildly exothermic reaction initiated, and a little cooling was applied for a few minutes to keep the temperature below 80° C. Not all the sulfur reacted during this exothermic period so the reaction mixture was warmed at 90°–120° C. for one hour after which time the reaction mixture was clear and colorless. Another 4.8 g. of sulfur (making 90.0% of theory) was added. It all reacted but a light yellow color remained after 0.5 hour at 110°–130° C. Another 25.5 g. of phosphite starting material was added. The yellow color disappeared after a few minutes at 115°–120° C. The colorless product was then concentrated to 160° C./0.5 mm. with stirring to give 560 g. of 1-[bis(2-chloropropoxy)phosphinyl]propyl bis(2 - chloropropyl) phosphorothioate. Nuclear magnetic resonance measurements on phosphorus showed that all of the trivalent phosphorus of the intermediate had been converted to the pentavalent phosphorothioate state in the final product.

EXAMPLE 7

A 566.2 g. (1.00 mole) portion of 1-[bis(2-chloropropoxy)phosphinyl]heptyl bis(2-chloropropyl) phosphite, prepared by reacting n-heptaldehyde with an equimolar mixture of bis(2-chloropropyl)phosphorochloridite and tris(2-chloropropyl) phosphite, and 25.6 g. of sulfur were placed in a 1 liter flask and stirred and warmed. At about 55° C. an exothermic reaction started and the temperature increased spontaneously to 105° C. The sulfur was not all dissolved as yet so the reaction mixture was then warmed to 160° C. The reaction mixture became clear and colorless at 130° C. The liquid was heated to 170° C./1.0 mm. to give 583 g. (99% yield) of a clear colorless liquid, $n_D^{25}$ 1.4824, having the formula

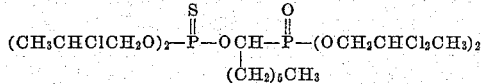

EXAMPLE 8

A 51 g. (0.1 mole) portion of 1-[bis(2-chloropropoxy)phosphinyl]propyl bis(2-chloropropyl) phosphite, prepared in the same manner as that used in Example 6, was placed in a 500 ml. flask and stirred and cooled as 15.8 g. (0.1 mole) of propylene trimer hydroperoxide was added in 0.2 hour. There was a very exothermic reaction towards the end of the addition. The temperature varied from 15°–35° C. A test of the colorless reaction mixture for peroxide with potassium iodide solution was negative. Distillation gave 11.5 g. of a light yellow liquid, nonenyl alcohol, B.P. 51°–65° C./1.0 mm., $n_D^{25}$ 1.4417, and 53.0 g. of a light yellow liquid residue (maximum pot temperature 150° C./1.0 mm.) having the formula

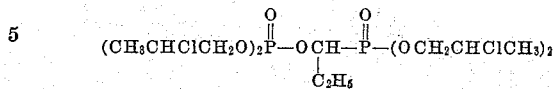

EXAMPLE 9

Into a 500 ml. flask equipped with a stirrer, thermometer, and condenser with a drying tube was charged 240.5 g. (0.479 mole) of α-[bis(2-chloroethoxy)phosphinyl]benzyl bis(2-chloroethyl) phosphite, made by reacting ethylene oxide, phosphorus trichloride, and benzaldehyde. Then 14.5 g. of sulfur was added. There was no apparent reaction until the mixture was warmed to 60° C. at which point an exothermic reaction started, and the temperature increased spontaneously to 76° C. The temperature was then raised to 130° C. The mixture, although clear, was yellow, indicating excess sulfur. Therefore, 25.5 g. of the phosphite-phosphonate starting material was added in three portions at 125° C. at 15 minute intervals. When it was all added the mixture was heated to 160° C. to give 279.9 g. of α-[bis(2-chloroethoxy)phosphinyl]benzyl bis(2 - chloroethyl)phosphorothioate having the formula

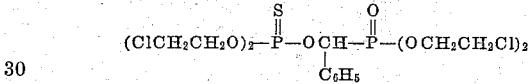

EXAMPLE 10

A 500 ml. flask equipped as in Example 9 was charged with 88.0 g. (0.124 mole) of 1-[bis(2,3-dichloropropoxy) phosphinyl]2-phenylethyl bis(2,3-dichloropropyl) phosphite, prepared by reacting phenylacetaldehyde with an equimolar mixture of bis(2,3-dichloropropoxy) phosphorochloridite and tris(2,3-dichloropropyl)phosphite. Then 3.0 g. of sulfur was added at room temperature, and the mixture was stirred for 10 minutes and then heated to 145° C. over a period of 45 minutes. All of the sulfur had reacted so 0.5 g. more of sulfur was added and the mixture was heated to 140° C. There was thus obtained 90.7 g. of viscous product having the formula

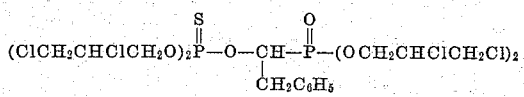

EXAMPLE 11

A 500 ml. flask equipped as in Example 9 was charged with 97.1 g. (0.174 mole) of 1-[bis(2-chloro-3-butenyloxy) phosphinyl] propyl bis (2-chloro-3-butenyl) phosphite, prepared by reacting propionaldehyde with an equimolar mixture of bis(2-chloro-3-butenyl) phosphorochloridite and tris(2-chloro-3-butenyl) phosphite. Then 4.9 g. of sulfur was added and the resulting mixture was stirred for 10 minutes and then gradually heated to 135° C. to give a viscous product having the structural formula

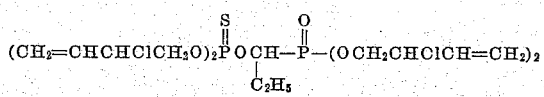

EXAMPLE 12

Into a 500 ml. flask equipped as in Example 9 was charged 147.9 g. of 1-[bis(2-chloro-3-isopropoxypropoxy)phosphinyl]ethyl bis (2-chloro - 3 - isopropoxypropyl) phosphite, prepared by reacting acetaldehyde with an equimolar mixture of bis(2-chloro-3-isopropoxypropoxy) phosphorochloridite and tris(2-chloro-3-isopropoxypropyl) phosphite. Then 5.5 g. of sulfur was added and the mixture was warmed to 155° C. to give 1-[bis(2- chloro - 3 - isopropoxypropoxy)phosphinyl]ethyl bis(2-chloro-3-isopropoxypropyl) phosphorothioate.

EXAMPLE 13

Into a 500 ml. flask equipped as in Example 9 was charged 39.0 g. (0.064 mole) of 1-[bis(2-chloropropoxy)-phosphinyl]-2-chloroethyl bis(2-chloropropyl) phosphite and 1.7 g. of sulfur. The mixture was then gradually heated to 135° C. to give 40.8 g. of viscous, colorless 1-[bis(2 - chloropropoxy)phosphinyl]-2-chloroethyl bis(2-chloropropyl) phosphorothioate.

EXAMPLE 14

A 500 ml. flask equipped as in Example 9 was charged with 120.6 g. (0.274 mole) of 1-[bis(2-chloroethoxy)-phosphinyl]ethyl bis(2-chloroethyl) phosphite and 7.0 g. of sulfur. The mixture was then gradually heated to 142° C. to produce 1-[bis(2-chloroethoxy)phosphinyl]-ethyl bis(2-chloroethyl) phosphorothioate.

EXAMPLE 15

A polyphosphonate having dissimilar alcohol residues was prepared as follows:

To a solution consisting of 16.5 g. (0.065 mole) of bis-(2-chloropropyl) phosphorochloridite and 5.4 g. (0.032 mole) of triethyl phosphite in 30 ml. of methylene chloride there was added during 0.1 hour 3.8 g. (0.065 mole) of propionaldehyde while maintaining the temperature of the reaction mixture at 20°–30° C. by cooling. When the heat of reaction had subsided (about 0.1 hour after all of the aldhehyde had been added), the mixture was warmed at reflux for 0.5 hour, distilled to a pot temperature of 70° C., and then concentrated to 107° C./0.02 mm. to obtain a phosphite-polyphosphonate, $n_D^{25}$ 1.4696.

Reaction of the above prepared phosphite-polyphosphonate with ozone in dry methylene chloride at −50° C. to −60° C. gives a phosphate-polyphosphonate of the formula

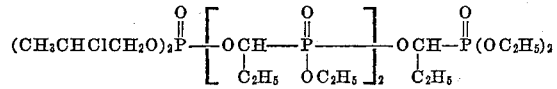

EXAMPLE 16

This example described the production of a phosphite-diphosphonate by reaction of acetaldehyde with a mixture of phosphite and phosphorochloridite prepared from 16.0 moles of phosphorus trichloride and 37.36 moles of propylene oxide, and the thionation of the phosphite-diphosphosphonate to the phosphorothioate - diphosphonate.

The mixture of phosphite and phosphorochloridite was prepared as follows: A 5-liter flask equipped with a glass and Teflon stirrer, thermometer, water condenser (protected) and a dropping funnel extending below the liquid surface was swept with nitrogen and charged with 2200 g. (16.0 moles) of phosphorus trichloride and 16.5 g. of ethylene chlorohydrin. The flask was cooled in a Dry Ice-triclene bath as 2167 g. (37.36 moles) of propylene oxide was added below the surface at 25–30° C. in 0.9 hr.

After removing a 6.0 g. sample of the resulting reaction mixture, the remainder, consisting of one mole of tris(2-chloropropyl) phosphite per two moles of bis(2-chloropropyl) phosphorochlorodite, was treated with 516 g. (10.64 moles+10% excess) of acetaldehyde in 0.4 hr. After the heat of reaction had subsided, the reaction mixture was warmed at 80°–90° C. for 0.5 hr., cooled to 55° C., and then concentrated to 125° C./0.01 mm. to give 1224 g. of propylene dichloride and excess acetaldehyde in a Dry Ice trap and 3624 g. of a viscous, colorless, clear residue, $n_D^{25}$ 1.4812, having the formula

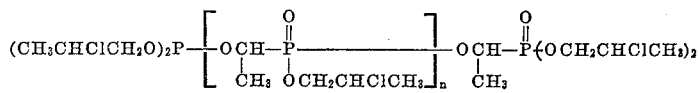

wherein $n$ has an average value of 1. Cryoscopic molecular weight determination of the product gave a value of 694 as compared to 680.71, the theoretical value.

Approximately 3400 g. of the above material was treated with 120.2 g. of flowers of sulfur at 50° C. The temperature of the mixture increased spontaneously to 96° C. The mixture was warmed to 140° C., (the reaction mixture became clear at 130° C.) and finally concentrated to 140° C./0.01 mm. to obtain 3516 g. of a clear, colorless liquid, $n_D^{25}$ 1.4869, having the formula

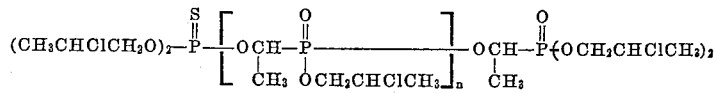

wherein $n$ has an average value of 1. Cryoscopic molecular weight determination of the product in benzene gave a value of 737 as compared to 712, the theoretical value. Nuclear magnetic measurements showed that the trivalent phosphorus of the phosphite-polyphosphonate intermediate was converted to the pentavalent state.

EXAMPLE 17

A 500 ml. flask equipped with a stirrer, thermometer, condenser with a drying tube, and a dropping funnel was charged with 137.35 g. (1.0 mole) of phosphorus trichloride and 1.4 g. of 2-chloroethanol. The solution was cooled to 3° C. and 123.4 g. (2.125 moles) of propylene oxide was added dropwise in 27 minutes at 0°–5° C., using a Dry Ice-triclene bath for cooling. When addition of propylene oxide was completed, the bath was removed and the mixture was allowed to stir for ten minutes. Then 50.8 g. (0.875 mole) of propionaldehyde was added dropwise to the mixture in 12 minutes. The addition was started at 0° C. and carried out at 20°–30° C. while cooling the flask in a Dry Ice-triclene bath. When the addition was complete, the mixture was allowed to stir until no further reaction was apparent.

The dropping funnel was removed and the condenser was replaced with a distilling head. The mixture was warmed to 80° C., and 3.4 g. of sulfur was added. Propylene dichloride by-product was distilled as the mixture was warmed to 142° C. to complete reaction of the sulfur. The mixture was then concentrated to 140° C./0.7 mm. to give 227 g. of viscous liquid product having the formula

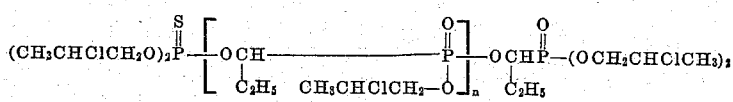

wherein $n$ had an average value of 6.

EXAMPLE 18

To a 500 ml. flask equipped as in Example 9 there was charged 128.6 g. (0.164 mole) of the phosphite-polyphosphonate product having the formula

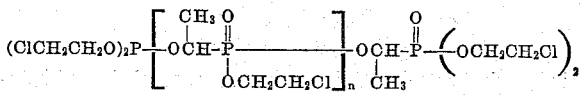

wherein $n$ has an average value of 2, such product having been prepared by reacting two moles of phosphorus trichloride with 4.5 moles of ethylene oxide to obtain a mixture of tris(2-chloroethyl) phosphite and bis(2-chloroethyl) phosphorochloridite and subsequent reaction of said mixture with acetaldehyde to obtain the above phosphite-polyphosphonate material.

To this material 3.2 g. of sulfur was added and the mixture was gradually warmed to 116° C. and maintained at that temperature for 15 minutes. After this time three portions of sulfur, 0.5 g., 0.4 g., and 0.4 g., respectively, were added at 5-15 minute intervals while stirring the mixture and maintaining the temperature at 125°-135° C. After addition of the last portion of sulfur the mixture was stirred at 120-135° C. for 25 minutes to insure complete reaction of the phosphite and the sulfur. There was thus obtained 132.9 g. of a phosphorothioate product having the formula

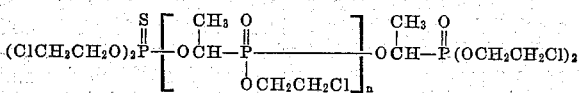

wherein $n$ has an average value of 2.

EXAMPLE 19

To a 500 ml. flask equipped as in Example 9 there was charged 65.8 g. (0.101 mole) of the phosphite-polyphosphonate compound having the formula

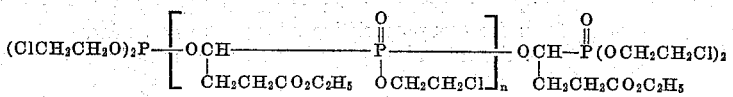

wherein $n$ has an average value of 0.5, such phosphite-polyphosphonate product having been prepared by reacting two moles of phosphorus trichloride with 4.8 moles of ethylene oxide, and adding to the resulting reaction mixture, comprising bis(2-chloroethyl) phosphorochloridite and tris(2-chloroethyl) phosphite, 0.15 mole of ethyl 3-formylpropionate to obtain from the resulting reaction, the above phosphite-polyphosphonate. Then 2.9 g. of sulfur was added and the mixture was warmed to 135° C. to give 68.4 g. of colorless, slightly cloudy phosphorothioate having the formula

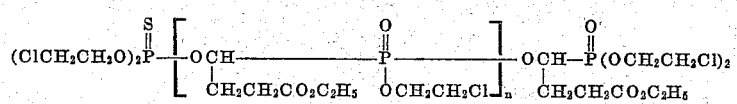

wherein $n$ has an average value of 0.5.

EXAMPLE 20

To 89.1 g. (0.164 mole) of a phosphite-polyphosphonate having the formula

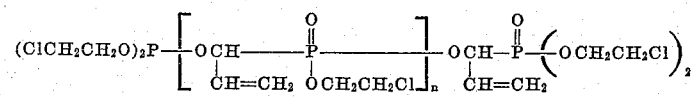

where $n$ has an average value of 0.5, said phosphite-polyphosphonate having been prepared by reacting 2 moles of phosphorus trichloride with 4.8 moles of ethylene oxide to obtain a mixture of tris(2-chloroethyl) phosphite and bis(2-chloroethyl) phosphorochloridite and subsequently reacting this mixture with 70.6 g. of acrolein, there was added 4.3 g. of sulfur, and the mixture was warmed to 135° C. When the product cooled to 30° C., unreacted sulfur precipitated so 11.9 g. more of starting phosphite-phosphonate was added and the mixture was heated to 120° C. There was thus obtained 105.4 g. of a mixture containing about one-half as 1-[bis(2-chloroethoxy)phosphinyl]-2-propenyl bis(2-chloroethyl) phosphorothioate, the remainder being the phosphorthioate-phosphonate

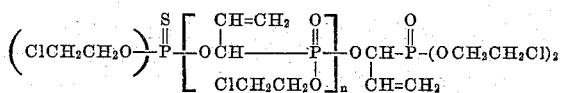

where $n$ has a value of 1.

EXAMPLE 21

This example illustrates the utility of the disclosed compounds as preignition additives for leaded gasolines.

Since it has been established that there is a close relationship between the quantity of a material required to suppress glowing and the effectiveness of the same material for reducing preignition of a leaded fuel in gasoline engines, testing of the presently prepared phosphorus compounds was conducted by a glow test method wherein the following procedure was employed.

Test blends were prepared by blending (1) 5 ml. of a fuel consisting of a high-boiling (380-420° F.) hydrocarbon fraction containing approximately 115 mg. of lead based on the quantity of commercial tetraethyllead-halohydrocarbon additive (hereinafter referred to as TEL) which had been incorporated therein and 1 ml. of an SAE 30 grade lubricating oil with (2) graduated, precisely weighed quantities of one of the phosphorus compounds to be tested, said quantities being in the range of 0.01 to 2.0 times the quantity of lead present. Two ml. of the test blend was then dropped at a constant rate (1.5±0.1 ml./15 minutes), during a 15-17 minute period, onto a reagent grade decolorizing carbon contained in a crucible maintained in a furnace at a temperature which was high enough to keep the bottom of the crucible at ca. 1,000° F. By using test blends containing progressively lower quantities of the test compound, there was determined the minimum concentration of the test compound at which no glowing of the carbon was evidenced either during the dropping period or after all of the test sample had been added. Under these conditions, a "control" sample, i.e., one which contained all of the constituents of the test blend except the phosphorus compound, caused the carbon to glow throughout addition thereof and after addition had been completed. Tri-cresyl phosphate, TCP, a commercial additive was tested according to this method. No glowing was observed when there was present in the test blend 0.0656 gm. of TCP per 5 ml. of said fuel blend. On the other hand, no glowing was observed when there was present in the test blend 0.0474 gm. of 1-[bis(2-chloropropoxy)phosphinyl]-propyl bis(2-chloropropyl) phosphorothioate, or 0.0523 gm. of 1-[bis(2-chloropropoxy)phosphinyl]heptyl bis(2-chloropropyl) phosphorothioate, both of said products having been prepared as described herein.

Instead of the phosphorothioate-phosphonate products, there may be used for the purpose of effectively inhibiting preignition of leaded fuels, any of the gasoline soluble phosphite-free products prepared according to the present process. While as will be obvious to those skilled in the art, the compound to be useful must be present in the gasoline in soluble form, it will also be realized that since the additive is employed in only very low concentrations, gasoline solubility at the useful concentrations is possessed by the great preponderance of the presently prepared compounds. Whether the phosphite-free product is soluble in the gasoline at the effective concentration can be readily ascertained by routine experimentation.

Inasmuch as the crude reaction mixture obtained by the present process comprises an aliphatic halohydrocarbon as by-product, the latter obviously can serve conveniently as the lead scavenger in leaded gasoline fuels containing the presently prepared pentavalent phosphorus esters.

Leaded gasolines containing the presently prepared phosphite-free compounds are compatible with other additives customarily used in the art, e.g., rust-inhibitors, stabilizers or antioxidants, dyes, etc. The pentavalent phosphorus esters of this invention may be employed in different proportions than specifically shown and with such other additives and adjuvants.

The presently provided invention is particularly useful because of the broad variation of products that can be obtained. Not only can the reactants be varied to give innumerable products, but the ratio of reactants can be changed to even further multiply the products obtainable. Of considerable usefulness is the variation in properties, such as change of viscosity, volatility, fire resistance, hydrolytic stability, solubility, and polarity that can be made by change of reactant ratios.

Those compounds wherein the value of n in the general formula, i.e., the number of repeating units,

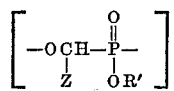

has an average value between 0 and 1, or between two successive whole numbers, such as in the cases wherein the value of n is 0.5, 1.3, 2.8, etc. are also intended to be within the scope of this invention since a product having such an intermediate value is really a mixture of products having lower and higher whole number values of n, which values depend upon the molar ratio of the reactants used to prepare the starting materials.

I claim:

1. A pentavalent phosphorus ester selected from the class consisting of diesters of the formula

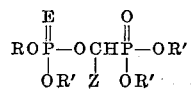

and polyesters of the formula

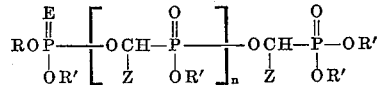

wherein R is selected from the group consisting of haloalkyl, haloalkenyl, alkoxyhaloalkyl, and aryloxyhaloalkyl radicals of from 1 to 12 carbon atoms wherein halo denotes a member of the group consisting of chlorine and bromine, R' is selected from the group consisting of R, hydrocarbyl, and halohydrocarbyl radicals of from 1 to 12 carbon atoms each, Z is selected from the group consisting of hydrogen, hydrocarbyl, halohydrocarbyl, cyanohydrocarbyl, carboalkoxyhydrocarbyl, alkoxyhydrocarbyl, alkylthiohydrocarbyl radicals of from 1 to 17 carbon atoms, and the thienyl and furyl radicals, n is a number having an average value of at least 1, and E is selected from the group consisting of oxygen and sulfur.

2. A pentavalent phosphorus diester of the formula

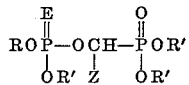

in which R is selected from the group consisting of haloalkyl, haloalkenyl, alkoxyhaloalkyl, and aryloxyhaloalkyl radicals of from 1 to 12 carbon atoms wherein halo denotes a member of the group consisting of chlorine and bromine, R' is selected from the group consisting of R, hydrocarbyl, and halohydrocarbyl radicals of from 1 to 12 carbon atoms each, Z is selected from the group consisting of hydrogen, hydrocarbyl, halohydrocarbyl, cyanohydrocarbyl, carboalkoxyhydrocarbyl, alkoxyhydrocarbyl, and alkylthiohydrocarbyl radicals of from 1 to 17 carbon atoms, and the thienyl and furyl radicals, n is a number of at least 1, and E is selected from the group consisting of oxygen and sulfur.

3. A pentavalent phosphorus polyester of the formula

wherein R is selected from the group consisting of haloalkyl, haloalkenyl, alkoxyhaloalkyl, and aryloxyhaloalkyl radicals of from 1 to 12 carbon atoms wherein halo denotes a member of the group consisting of chlorine and bromine, R' is selected from the group consisting of R, hydrocarbyl, and halohydrocarbyl radicals of from 1 to 12 carbon atoms each, Z is selected from the group consisting of hydrogen, hydrocarbyl, halohydrocarbyl, cyanohydrocarbyl, carboalkoxyhydrocarbyl, alkoxyhydrocarbyl, and alkylthiohydrocarbyl radicals from 1 to 17 carbon atoms and the thienyl and furyl radicals, n is a number having an average value of at least 1, and E is selected from the group consisting of oxygen and sulfur.

4. A pentavalent phosphorus compound of the formula

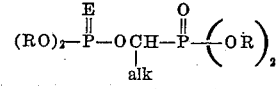

wherein R is selected from the group consisting of haloalkyl, haloalkenyl, alkoxyhaloalkyl, and aryloxyhaloalkyl radicals of from 1 to 12 carbon atoms wherein halo denotes a member of the group consisting of chlorine and bromine, alk denotes an alkyl radical of from 1 to 17 carbon atoms, and E is selected from the group consisting of oxygen and sulfur.

5. A pentavalent polyphosphorus ester of the formula

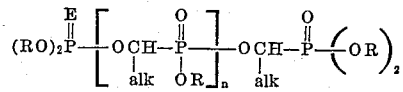

wherein R is selected from the group consisting of haloalkyl, haloalkenyl, alkoxyhaloalkyl, and aryloxyhaloalkyl radicals of from 1 to 12 carbon atoms, alk denotes an alkyl radical of from 1 to 17 carbon atoms, $n$ is a number having an average value of at least 1, and E is selected from the group consisting of oxygen and sulfur.

6. A phosphate-phosphonate of the formula

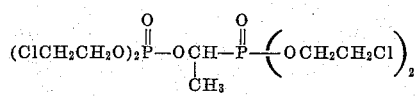

7. A phosphate-phosphonate of the formula

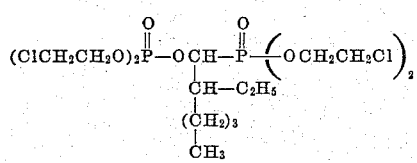

8. A phosphorothioate-phosphonate of the formula

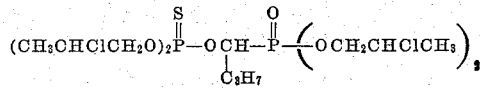

9. A phosphorothioate-phosphonate of the formula

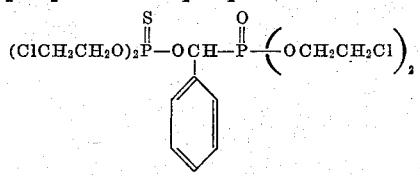

10. A phosphorothioate-polyphosphonate of the formula

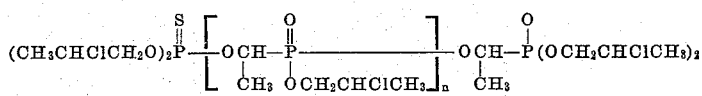

wherein $n$ has an average value of 1.

11. A phosphorothioate-polyphosphonate of the formula

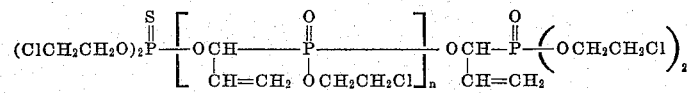

wherein $n$ has an average value of 1.

References Cited in the file of this patent

UNITED STATES PATENTS

| | | |
|---|---|---|
| 2,857,415 | Birum | Oct. 21, 1958 |
| 2,892,691 | Howell | June 30, 1959 |
| 2,897,071 | Gilbert | July 28, 1959 |
| 2,897,228 | Scott et al. | July 28, 1959 |

UNITED STATES PATENT OFFICE
CERTIFICATE OF CORRECTION

Patent No. 3,042,701                          July 3, 1962

Gail H. Birum

It is hereby certified that error appears in the above numbered patent requiring correction and that the said Letters Patent should read as corrected below.

Column 5, lines 15 to 24, the equation should appear as shown below instead of as in the patent:

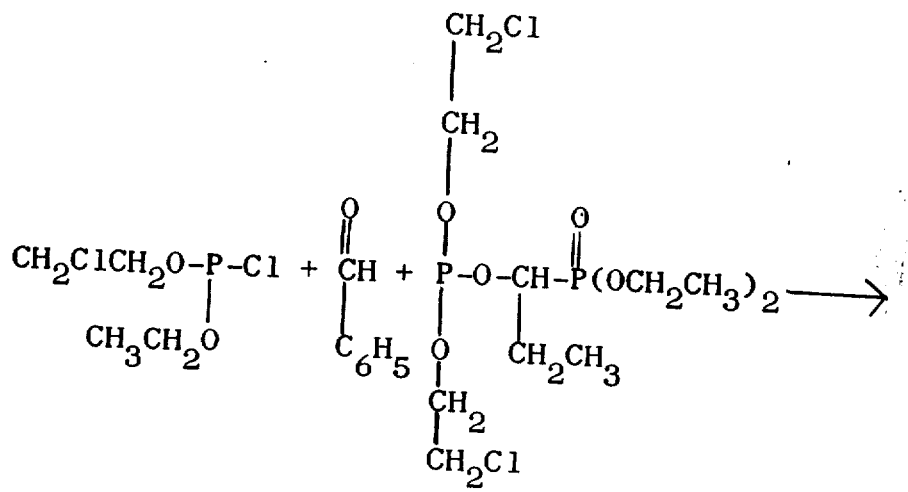

column 13, line 29, after "-ethylhexyl" insert a closing parenthises.

Signed and sealed this 25th day of December 1962.

(SEAL)
Attest:

ERNEST W. SWIDER
Attesting Officer

DAVID L. LADD
Commissioner of Patents